United States Patent
Okada et al.

(10) Patent No.: US 6,293,377 B1
(45) Date of Patent: Sep. 25, 2001

(54) VARIABLE-DAMPING FORCE SHOCK ABSORBER

(75) Inventors: Yoshimasa Okada; Ichisei Kamimura, both of Okazaki; Kiyoshi Kono, Oogaki, all of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/460,040

(22) Filed: Dec. 13, 1999

(30) Foreign Application Priority Data

Dec. 16, 1998 (JP) .................................................. 10-358254

(51) Int. Cl.⁷ ...................................................... F16F 9/46
(52) U.S. Cl. .................................. 188/282.2; 188/266.5; 188/299.1; 188/319.1
(58) Field of Search ............................ 188/266.3, 266.4, 188/266.5, 282.2, 282.4, 299.1, 322.15, 319.1

(56) References Cited

U.S. PATENT DOCUMENTS

| 4,635,765 | * | 1/1987 | Schmidt | 188/299 |
| 5,303,803 | * | 4/1994 | Grun et al. | 188/299 |
| 5,305,860 | * | 4/1994 | Rotharmel et al. | 188/299 |
| 5,911,290 | * | 6/1999 | Steed | 188/282.4 |

FOREIGN PATENT DOCUMENTS

| 5-60165 | | 3/1993 | (JP) . |
| 5-263865 | * | 10/1993 | (JP) . |
| 7-167192 | * | 7/1995 | (JP) . |

* cited by examiner

Primary Examiner—Douglas C. Butler
Assistant Examiner—Bradley King
(74) Attorney, Agent, or Firm—Kenyon & Kenyon (57) ABSTRACT

An actuator disposed within a piston rod of a variable-damping force shock absorber has coils mounted at an inner peripheral face of the piston rod, permanent magnets disposed facing a stator, and a cylindrical body supported rotatably about the piston rod axis. The permanent magnets are fixed to a side face of an upper portion of the cylindrical rotating body and an insert hole into which an upper end portion of a shaft is inserted extends through a lower portion of the rotating body. A female thread is formed in the insert hole, and engaged with a male thread formed on an outer peripheral face of the upper end portion of the shaft. A spool is mounted on a lower end portion of the shaft so that, as the rotating body rotates, the spool moves in the direction of the piston rod axis and thereby changes the opening of a communication passage between upper and lower chambers of a cylinder. The piston rod of the variable-damping force shock absorber has a reduced diameter.

22 Claims, 6 Drawing Sheets

VARIABLE-DAMPING FORCE SHOCK ABSORBER

INCORPORATION BY REFERENCE

The disclosure of Japanese Patent Application No. HEI 10-358254 filed on Dec. 16, 1998, including the specification, drawings and abstract, is incorporated herein by reference in its entirety.

BACKGROUND OF THE INVENTION

1. Field of the Invention

The present invention relates to a shock absorber that creates a damping force for restraining vibratory motions of an object that is elastically supported by a supporting member, for example, a vehicle body. More particularly, the invention relates to a variable-damping force shock absorber in which the damping force can be changed.

2. Description of the Related Art

A conventional shock absorber apparatus is formed by various components as follows. A cylinder containing operating fluid is divided into first and second chambers by a piston disposed in the cylinder slidably in directions of an axis thereof. A hollow piston rod is connected at an end portion thereof to the piston. Another end portion of the hollow piston rod protrudes from an end face of the cylinder. A spool of a valve mechanism is provided at a piston-side end portion of the piston rod in such a manner that the spool is displaceable in directions of an piston rod axis. In accordance with the displacement of the spool in a direction of the piston rod axis, the valve mechanism changes the opening of a communication passage interconnecting the first and second chambers. An actuator is substantially made up of a stator mounted to an inner peripheral surface of the piston rod, a rotor disposed facing the stator so as to rotate about the piston rod axis relative to the stator, and a rotating body supported on an inner peripheral surface of the piston rod for rotation about the piston rod axis. The rotating body is fixed to the rotor so that the rotating body rotates together with the rotor. The actuator outputs rotating drive force created by rotation of the rotor via the rotating body. The shock absorber apparatus further includes a drive force converting mechanism that converts rotating drive force from the actuator into drive force in a direction of the piston rod axis. Furthermore, the drive force converting mechanism transfers the converted drive force to the spool of the valve mechanism so as to displace the spool in a direction of the piston rod axis. In the conventional shock absorber apparatus, the rotor of the actuator and the drive force converting mechanism are disposed overlapping each other in a direction of a radius of the piston rod, as disclosed in, for example, Japanese Patent Application Laid-Open No. HEI 5-60165.

However, since the rotor of the actuator and the drive force converting mechanism are disposed overlapping each other in a radial direction with respect to the piston rod, this conventional shock absorber apparatus has a problem of an increased diameter of the piston rod.

SUMMARY OF THE INVENTION

Accordingly, it is an object of the present invention to provide a variabledamping force shock absorber in which a piston rod has a reduced diameter.

In accordance with the invention, a rotor of an actuator and a drive force converting mechanism are arranged at different positions in a direction of an axis of a piston rod. Therefore, it becomes possible to arrange the rotor of the actuator and the drive force converting mechanism so that they do not overlap each other in a direction of a radius of the piston rod. As a result, the piston rod is allowed to have a reduced diameter.

In the above-described variable-damping force shock absorber, the drive force converting mechanism may include a shaft disposed in the piston rod in such a manner that the shaft is allowed to move in the direction of the piston rod axis and is prevented from turning about the axis, the shaft being connected at an end of the shaft to the spool, and a screw mechanism having a screw portion formed in another end portion of the shaft and another screw portion formed in the rotating body of the actuator which screw portions are engaged with each other, the screw mechanism displacing the shaft in the direction of the piston rod axis as the rotating body rotates. Therefore, the drive force converting mechanism does not require a complicated construction in order to convert the rotating drive force from the actuator into a drive force in a direction of the piston rod axis and to transfer the drive force to the spool of the valve mechanism and thereby displace the spool in the direction of the piston rod axis.

The variable-damping force shock absorber may further have a construction as follows. That is, the rotating body of the actuator may be cylindrically shaped and disposed coaxially with the piston rod with the rotor embedded in a side face of the rotating body, and with an insert hole into which an end portion of the shaft is inserted formed in an end face of the rotating body. Furthermore, the screw mechanism may include a female thread formed in the insert hole of the rotating body and a male thread formed on an outer peripheral face of the end portion of the shaft. This construction makes it possible to form the rotor and the rotating body of the actuator and the female thread of the drive force converting, mechanism into an integral cylindrical shape, thereby facilitating accommodation or containment of these members into the piston rod.

The variable-damping force shock absorber may further have a construction as follows. The rotating body of the actuator may have a bypass passage connected between an outside of the rotating body and a bottom portion of the insert hole. At least one of the first and second chambers of the cylinder may be connected to the insert hole of the rotating body in communication via an outer peripheral face of the shaft, an outer peripheral face of the rotating body and the bypass passage. Therefore, volume changes of the operating fluid in the insert hole are allowed by the operating fluid flowing into or out of the insert hole through the bypass passage. Consequently, the shaft can be displaced within the insert hole in the directions of the piston rod axis without a need to form a special bleed channel or hole in the shaft. Since the rotating body of the actuator, in comparison with the shaft, is not required to have a considerable strength, the rotating body can easily be forraed. Therefore, it becomes possible to produce the variable-damping force shock absorber at a low cost.

Furthermore, the rotating body may have, in a side face of the rotating body, a groove extending in a direction of an axis of the rotating body. The groove guides the operating fluid from the vicinity of the outer peripheral surface of the shaft to the bypass passage. Therefore, it becomes unnecessary to arrange a special space around the outer peripheral surface of the rotating body for passing the operating oil. As a result, the piston rod can have a reduced diameter.

The variable-damping force shock absorber may further include a bottomed hollow-cylindrical support member fixed to the inner peripheral face of the piston rod coaxially with the piston rod, the support member accommodating therein the rotating body of the actuator, and an annular fixed bearing fixed, on an inner peripheral face of the fixed bearing, to the rotating body at a side of an open end of the support member. The outer peripheral face of the fixed bearing is positioned and fixed to an open end portion of the support member in the direction of the axis. In this construction, the rotating body is inserted into the support member from the open end of the support member. The fixed bearing is fixed in position relative to the support member in directions of an axis of the support member. As a result, the rotating body is positioned relative to the piston rod in the directions of the axis, and the rotating body is supported within the piston rod in such a manner that the rotating body is rotatable about the piston rod axis. Therefore, the rotating body can easily be mounted. Furthermore, in this construction, the fixed bearing is positioned and fixed to the support member in the directions of the axis. Consequently, it becomes possible to easily construct a small-size variable-damping force shock absorber.

The variable-damping force shock absorber may also have a construction as follows. That is, a hollow-cylindrical support member is fixed to the inner peripheral face of the piston rod coaxially with the piston rod. The support member accommodates therein the rotating body of the actuator. The support member directly supports, at an inner peripheral face of the support member, a portion of the rotating body of the actuator rotatably about the piston rod axis. Therefore, the construction of the variable-damping force shock absorber can be further simplified. Furthermore, the rotating body can be supported to the inner peripheral face of the piston rod in such a manner that the rotating body is rotatable about the piston rod axis.

The rotating body of the actuator may have a through passage that opens to an end face of the rotating body opposite from the end face of the rotating body to which the insert hole opens, the through passage connecting an outside of the rotating body and a bottom portion of the insert hole to each other in communication. Therefore, as the shaft reciprocates in the insert hole, the operating fluid moves between the inside of the insert hole and the outside of the end portion of the rotiting body opposite from the end portion from which the shaft is inserted, via the through passage. As a result, efficient circulation of the operating fluid around the entire rotating body is achieved. Therefore, it becomes possible to smoothly rotate the rotating body while the rotating body is supported by the simply and low-cost construction. The aforementioned efficient circulation of the operating fluid efficiently cools or removes heat that is generated as the rotor of the actuator turns relative to the stator.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
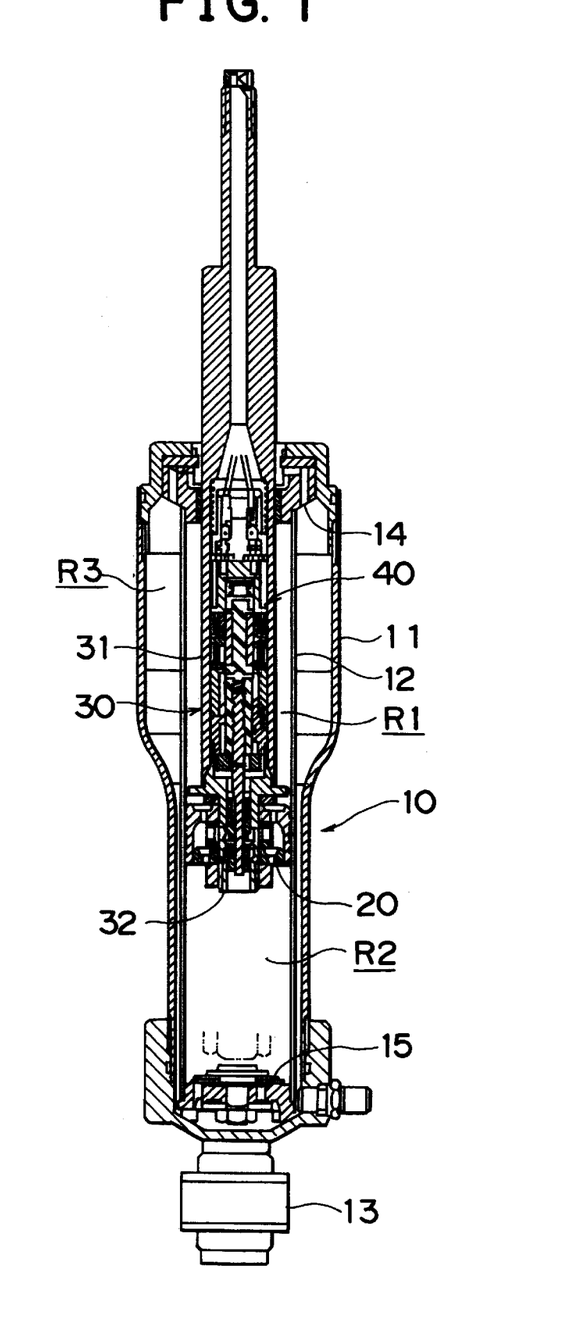
FIG. 1 is a longitudinal sectional view of the entire body of a vehicular variable-damping force shock absorber according to a first embodiment of the invention.

A first embodiment of the invention will be described with reference to FIGS. 1 to 3. In this embodiment, the variable-damping force shock absorber of the invention is applied to a vehicle. FIG. 1 is a longitudinal sectional view of the entire body of the vehicular variable-damping force shock absorber of the first embodiment. The variable-damping force shock absorber has a cylinder 10, a piston 20 disposed in liquid-tight contact with an inner peripheral surface of the cylinder 10 slidably in directions of an axis of the cylinder 10, and a piston rod 30 fixed to a lower end of the piston 20.

The cylinder 10 is formed by an outer cylinder 11 and an inner cylinder 12 that are cylindrical in shape and are coaxially disposed. The outer cylinder 11 is connectable at its lower end to a lower arm, that is, an unsprung member, via a bracket 13. The inner cylinder 12 is liquid-tightly supported at its upper end on an inner peripheral surface of an upper end portion of the outer cylinder 11 via an annular support plate 14. A lower end portion of the inner cylinder 12 is supported on an inner peripheral surface of a lower end portion of the outer cylinder 11 via an annular support plate 15.

An internal space of the inner cylinder 12 is divided by the piston 20 into an upper chamber R1 and a lower chamber R2 (first and second chambers). The upper and lower chambers R1, R2 are filled with an operating oil, that is, an operating fluid. The lower chamber R2 is connected, at a lower end of the inner cylinder 12, to an annular chamber R3 formed between the outer cylinder 11 and the inner cylinder 12. The annular chamber R3 contains a gas in a sealed manner, for absorbing volume changes of the operating oil that occur in the upper and lower chambers R1, R2 as the piston rod 30 reciprocates.

Figure 2:
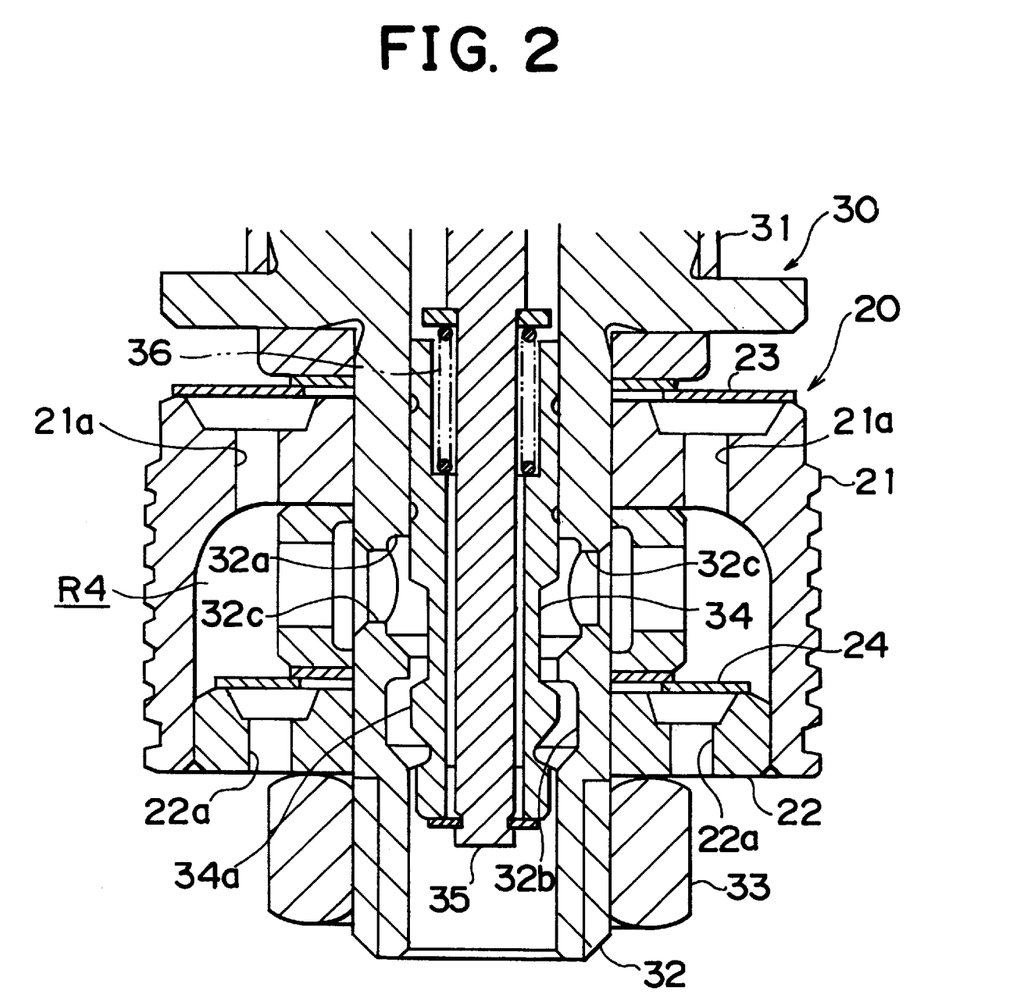
FIG. 2 is an enlarged longitudinal sectional view of a piston shown in FIG. 1.

The piston 20 is formed, as shown in detail in FIG. 2, by a cup-shaped member 21 and an annular member 22 each of which is fixed to an outer peripheral surface of the piston rod 30. The cup-shaped member 21 and the annular member 22 of the piston 20 define an oil chamber R4 around the outer peripheral surface of the piston rod 30. The cup-shaped member 21 and the annular member 22 have oil passages 21a and oil passages 22a, respectively, which are formed at suitable positions in a circumferential direction so as to connect the upper and lower chambers R1, R2 to the oil chamber R4 in communication. The two sets of oil passages 21a, 22a are provided with annular leaf valves 23, 24, respectively, each of which is disposed at one end of the corresponding set of oil passages for allowing oil to flow through the oil passages in either way.

The piston rod 30 is formed by an elongated body part 31 having a hollow-cylindrical shape, and a hollow-cylindrical sleeve 32. An upper end portion of the body part 31 is protruded from an upper end face of the cylinder 10 for reciprocal movements. The body part 31 is connectable at its upper end to a vehicle body, that is, a sprung member. An upper end portion of the sleeve 32 is liquid-tightly fixed to an inner peripheral surface of a lower end portion of the body part 31. A nut 33 is screwed onto an outer peripheral face of a lower end portion of the sleeve 32. The nut 33 serves to fix the piston 20 in position on the outer peripheral face of an intermediate portion of the sleeve 32. The lower end of the sleeve 32 is open to the lower chamber R2. The inner peripheral face of the sleeve 32 has annular grooves 32*a*, 32*b*. A portion of the peripheral wall of the sleeve 32 in which the annular groove 32*a* is formed has oil passages 32*c* formed at suitable positions in a circumferential direction. Thus, the oil passages 32*c* connect the lower chamber R2 to the oil chamber R4 via an internal space of the sleeve 32.

A hollow cylindrical spool 34 that forms a valve mechanism together with the sleeve 32 is disposed in the sleeve 32 in such a manner that the spool 34 is slidable in the directions of an axis of thereof. An annular protrusion 34*a* is formed on an outer peripheral surface of the spool 34. The position of the annular protrusion 34*a* relative to the annular grooves 32*a*, 32*b* in the directions of an axis thereof can be changed by displacing the spool 34 relative to the sleeve 32 in the directions of the axis, so as to change the opening (of an orifice) of the oil passage Between the inner peripheral surface of the sleeve 32 and the outer peripheral surface of the spool 34.

The spool 34 is coupled to an outer peripheral face of a lower end portion of a cylindrical shaft 35 disposed coaxially with the spool 34, in such a manner that the spool 34 is prevented from moving relative to the shaft 35 in directions of the axis. A side face portion of a lower end portion of the spool 34 is cut out. The cutout of the spool 34 and the oil passage formed between the inner peripheral surface of the spool 34 and the outer peripheral surface of the shaft 35 together connect the lower chamber R2 to the internal space of the body part 31 of the piston rod 30 in communication. The spool 34 is urged toward the lower end of the shaft 35 by a spring 36, so that an axis deviation of the spool 34 relative to the shaft 35 during the mounting of the spool 34 to the shaft 35 will be absorbed.

Figure 3:
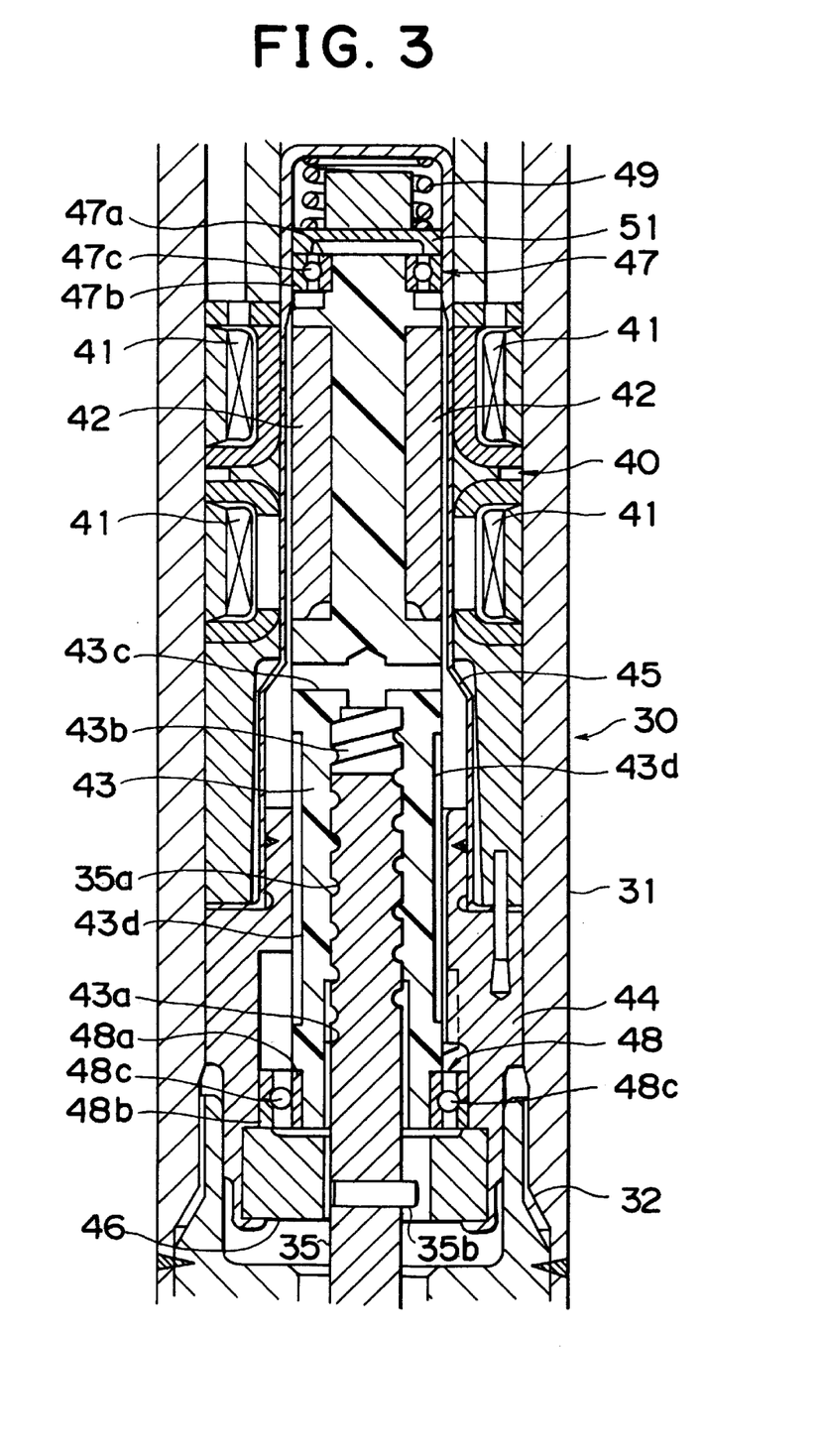
FIG. 3 is an enlarged longitudinal sectional view of a piston rod shown in FIG. 1.

An upper end portion of the shaft 35 is connected to an actuator 40 that is disposed within the piston rod 30, as shown in detail in FIG. 3. The actuator 40 has a plurality of coils 41 (stators) that are mounted onto the inner peripheral surface of the body part 31 of the piston rod 30, a plurality of permanent magnets 42 (rotors) disposed facing the coils 41, and a cylindrically-shaped rotating body 43 to which the permanent magnets 42 are fixed. The rotating body 43 is formed from a resin. The coils 41 are supplied with drive current from an external device via an electric wiring device (not shown). The permanent magnets 42 are arranged on a side face of an upper portion of the rotating body 43 in a circumferential direction. The permanent magnets 42 are embedded and fixed into the rotating body 43. Instead of providing a plurality of permanent magnets 42, it is possible to embed and fix a single annular permanent magnet formed by a pole-anisotropic multipolar magnet into the side face of an upper portion of the rotating body 43.

The rotating body 43 is disposed in a sleeve 45 and a housing 44 provided for the purpose of support. The housing 44 has a hollow cylindrical shape and is fixed to the inner peripheral surface of the body part 31 of the piston rod 30. The housing 44 accommodates a lower portion of the rotating body 43. An annular guide member 46 through which the shaft 35 extends is fixed to an inner peripheral surface of a lower end portion of the housing by crimping a lower edge portion of the housing onto an outer peripheral face of the guide member 46. An oil passage for passing the operating fluid is formed between the inner peripheral surface of the guide member 46 and the outer peripheral surface of the shaft 35. The guide member 46 has such a shape that a central portion of an upper face of the guide member 46 is recessed. Another oil passage for passing the operating fluid is formed between an upper face of the guide member 46 and a lower face of the rotating body 43. The sleeve 45 has the shape of a bottomed hollow cylinder having a lower end opening. The inner peripheral surface of a lower end portion of the sleeve 45 is liquid-tightly fixed to the outer peripheral surface of an upper end portion of the housing 44. The sleeve 45 accommodates an upper portion of the rotating body 43. The sleeve 45 also has the function of shielding the coils 41 and the aforementioned electric wiring device from the operating fluid flowing from the lower chamber R2.

Ball bearings 47, 48 are mounted to the outer peripheral surface of an upper end portion and the outer peripheral surface of a lower end portion of the rotating body 43. Each ball bearing 47, 48 is substantially made up of an inner wheel 47*a*, 48*a* and an outer wheel 47*b*, 48*b* that are coaxially disposed, alad a plurality of balls 47*c*, 48*c* disposed between the inner wheel 47*a*, 48*a* and the outer wheel 47*b*, 48*b*. Each ball bearing 47, 48 prevents the inner wheel 47*a*, 48*a* and the outer wheel 47*b*, 48*b* from moving relative to each other in the directions of the axis thereof, but allows the inner and outer wheels to rotate relative to each other about the axis. An inner peripheral surface of each inner wheel 47*a*, 48*a* is fitted to the outer peripheral surface of the rotating body 43. An outer peripheral surface of the outer wheel 47*b*, 48*b* is in contact with the inner peripheral surface of the sleeve 45 or the housing 44. Each ball bearing 47, 48 allows the operating fluid to pass between the inner wheel 47*a*, 48*a* and the outer wheel 47*b*, 48*b*.

The rotating body 43, integrated together with the ball bearings 47, 48, is loosely fitted into the housing 44 and the sleeve 45. A spring 49 disposed in an upper end portion of the sleeve 45 urges the rotating body 43 downward, via a spacer 51. The guide member 46 restricts downward displacement of the rotating body 43 by an upper face of the guide member 46 contacting the ball bearing 48. In this manner, the guide member 46 fixes the position of the rotating body 43 relative to the housing 44 in the direction of the axis thereof.

An insert hole 43*a* extends from a central portion of a lower end face of the rotating body 43 through a lower portion of the rotating body 43 upward along the axis thereof. An upper end portion of the shaft 35 extends in the insert hole 43*a*. An inner peripheral face of the insert hole 43*a* has a female thread 43*b*. The female thread 43*b* is screwed onto a male thread 35*a* that is formed in the outer peripheral face of an upper end portion of the shaft 35. The female thread 43*b* and the male thread 35*a* together form a screw mechanism. A pin 35*b* is planted into the outer peripheral face of an intermediate portion of the shaft 35. The pin 35*b* engages with a slit that is formed in the inner peripheral face of the guide member 46, so that the pin 35*b* prevents the shaft 35 from turning together with the rotating body 43, and allows the shaft 35 to move relative to the rotating body 43 only in the directions of the axis thereof. This construction converts rotation of the rotating body 43 about the axis into displacement of the shaft 35 in a direction of the axis.

A bypass passage 43*c* extends in a radial direction in an intermediate portion of the rotating body 43, so as to connect the outside of the rotating body 43 and a bottom portion of the insert hole 43a in communication. A plurality of grooves 43d extend in a side face of a lower portion of the rotating body 43 in the directions of the axis thereof. The grooves 43d are arranged side by side in a circumferential direction.

In the vehicular variable-damping force shock absorber constructed as described above, when the sprung member moves up and down relative to the unsprung member, the piston 20 and the piston rod 30 move up and down relative to the cylinder 10. During upward movement of the piston 20 and the piston rod 30, the operating oil flows from the upper chamber R1 into the oil chamber R4 via the leaf valve 23 and the oil passage 21a. The operating oil further flows from the oil chamber R4 into the lower chamber R2 via the leaf valve 24 and the oil passage 22a, and also via the oil passage 32c and the oil passage formed between the sleeve 32 and the spool 34. Conversely, during downward movement of the piston 20 and the piston rod 30, the operating oil flows from the lower chamber R2 into the oil chamber R4 via the oil passage 22a and the leaf valve 24, and via the passage formed between the sleeve 32 and the spool 34 and the oil passage 32c. The operating oil further flows from the oil chamber R4 into the upper chamber R1 via the oil passage 21a and the leaf valve 23. During the downward and upward displacements of the piston 20 and the piston rod 30, each oil passage of the operating oil serves as a drag on the flow of the operating oil, thereby creating a damping force against the vertical oscillation of the piston 20 and the piston rod 30.

During the aforementioned operation of the variable-damping force shock absorber, the damping force is changed whenever necessary. To change the damping force, a drive current is supplied to the coils 41. In response to supply of the drive current, the permanent magnets 42 and the rotating body 43 rotate together about the axis of the rotating body 43. As the rotating body 43 rotates, the shaft 35 moves in a direction of the axis. Together with the shaft 35, the spool 34 is displaced in the direction of the axis. The insert hole 43a is connected in communication to the lower chamber R2 via the bypass passage 43c, the grooves 43d of the rotating body 43, a gap between the inner and outer wheels 48a, 48b of the ball bearing 48, an oil passage between the lower face of the rotating body 43 and the upper face of the guide member 46, and an oil passage between the inner peripheral surface of the guide member 46 and the outer peripheral surface of the shaft 35. Therefore, the volume of the operating oil in the insert hole 43a is allowed to change, so that the shaft 35 is allowed to move up or down. Due to the displacement of the spool 34 together with the shaft 35, the opening of the oil passage between the spool 34 and the sleeve 32 changes, so that the damping force changes.

In this embodiment, the actuator 40 produces a rotating drive force by the permanent magnets 42 turning relative to the coils 41, and outputs the rotating drive force via the rotating body 43. The rotating drive force is converted into a drive force in a direction of the piston rod axis 30 by a drive for,.e converting mechanism that includes the shaft 35 and the screw mechanism formed by the male thread 35a and the female thread 43b. The axial drive force is transmitted to the spool 34 of the valve mechanism, thereby displacing the spool 34. Since the permanent magnets 42 of the actuator 40 and the drive force converting mechanism do not overlap in a direction of a radius of the piston rod 30, but are disposed at different positions in the direction of the piston rod axis 30, the piston rod 30 is allowed to have a reduced diameter. Furthermore, since the drive force converting mechanism is formed by the screw mechanism and the shaft 35, the drive force conversion and transmission can be performed without requiring a complicated construction.

In this embodiment, the rotating body 43 is disposed coaxially with the piston rod 30. The permanent magnets 42 are embedded and fixed into the side face of the rotating body 43, so as to form a cylindrical shape. The insert hole 43a receiving an upper end portion of the shaft 35 therein extends through a lower end portion of the rotating body 43. The male thread 35a is formed in the outer peripheral surface of an upper end portion of the shaft 35. The female thread 43b is formed in the inner peripheral surface of the insert hole 43a. Since the permanent magnets 42, the rotating body 43, and the female thread 43b, that is, a part of the drive force converting mechanism, are provided so as to form an integral cylindrical body, these members and structure can be favorably disposed within the piston rod 30.

Still further, volume changes of the operating fluid in the insert hole 43a are allowed by the operating fluid flowing into or out of the insert hole 43a through the bypass passage 43c formed in the rotating body 43. Therefore, the shaft 35 can be displaced relative to the insert hole 43a in the directions of the axis without a need to form a special bleed channel or hole in the shaft 35. Since the rotating body 43, in comparison with the shaft 35, is not required to have a considerable strength, the rotating body 43 is formed from a resin, so that the rotating body 43 can easily be molded. Therefore, it becomes possible to produce the variable-damping force shock absorber at a low cost.

The rotating body 43 has the grooves 43d extending in the side face of a lower portion thereof. The grooves 43d guide the operating oil from the vicinity of the outer peripheral surface of the shaft 35 to the bypass passage 43c. Therefore, it is not necessary to arrange a special space around the outer peripheral surface of the rotating body 43 for passing the operating oil. As a result, the piston rod 30 can have a reduced diameter.

Although in the foregoing embodiment, rotation of the rotating body 43 is converted into axial displacement of the shaft 35 by using the male thread 35a and the female thread 43b directly meshed together, this motion conversion may also be performed by using a screw mechanism in which balls are disposed between male and female threads 35a, 43b. Such a screw mechanism reduces the friction between the male and female threads 35a, 43b and therefore increases the efficiency of the motion conversion.

Figure 4:
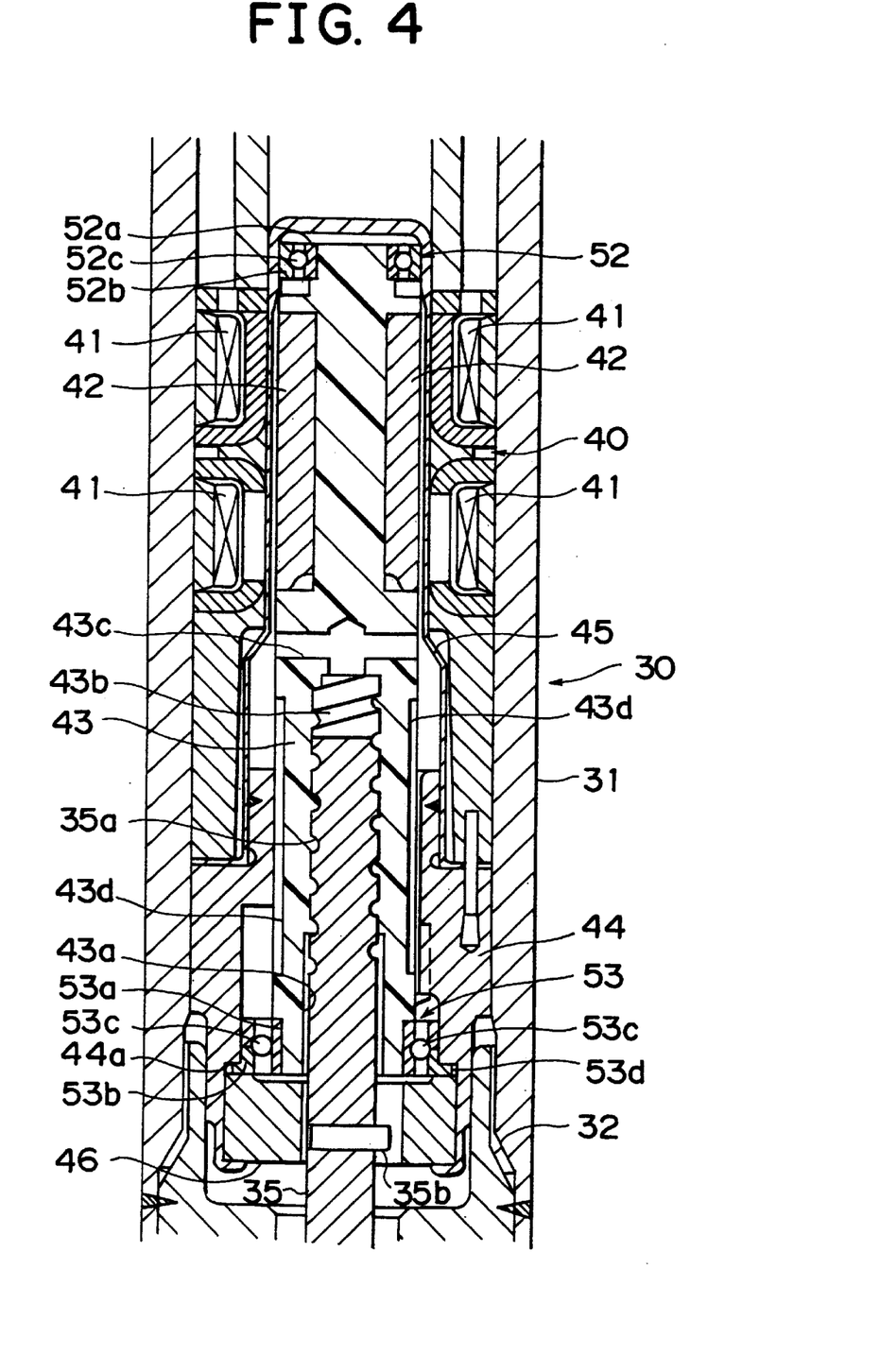
FIG. 4 is an enlarged longitudinal sectional view of a piston rod according to a second embodiment of the invention.

A second embodiment of the invention will now be described with reference to FIG. 4. This embodiment employs ball bearings 52, 53 instead of the ball bearings 47, 48 of the first embodiment, and omits the spring 49 and the spacer of the first embodiment.

Similar to the above-described ball bearings 47, 48, each ball bearing 52, 53 has an inner wheel 52a, 53a, an outer wheel 52b, 58b, and balls 52c, 53c. The inner wheels 52a, 53a are pressingly fitted and fixed to the outer peripheral surface of an upper end portion of a rotating body 43 and the outer peripheral surface of a lower end portion of the rotating body 43, respectively. The ball bearing 53 is a fixed bearing in which a flange 53d is formed in an outer peripheral face of a lower end portion of the outer wheel 53b. The flange 53d of the ball bearing 53 is clamped from above and below by a stepped portion 44a formed in an inner peripheral surface of a lower end portion of a housing 44 and an upper peripheral edge portion of a guide member 46. Thus, on the inner peripheral surface of the housing 44, the ball bearing 53 is fixed in position in directions of an axis of the housing 44. Therefore, the rotating body 43 is positioned relative to the housing 44 in the directions of the axis.

In the second embodiment, the rotating body 43 is inserted into a support member formed by the housing 44 and the sleeve 45 from an open end of the support member, that is, a lower end of the housing 44. After the rotating body 43 is inserted, the guide member 46 is fixed to a lower end portion of the housing 44 by crimping, so that the ball bearing 53 becomes fixed in position relative to the housing 44 in directions of an axis of the housing 44. As a result, the rotating body 43 is positioned relative to the support member in the directions of the axis, and the rotating body 43 is supported in the piston rod 30 in such a manner that the rotating body 43 is rotatable about the piston rod axis 30. Therefore, the rotating body 43 can easily be mounted. Furthermore, in the second embodiment, the ball bearing 53 is fixed to the inner peripheral surface of the housing 44 while the position of the ball bearing 53 relative to the housing 44 is defined in the directions of the axis. Therefore, it becomes possible to omit the spring 41 and the spacer 51 employed in the first embodiment. Consequently, it becomes possible to easily construct a small-size variable-damping force shock absorber.

Figure 5:
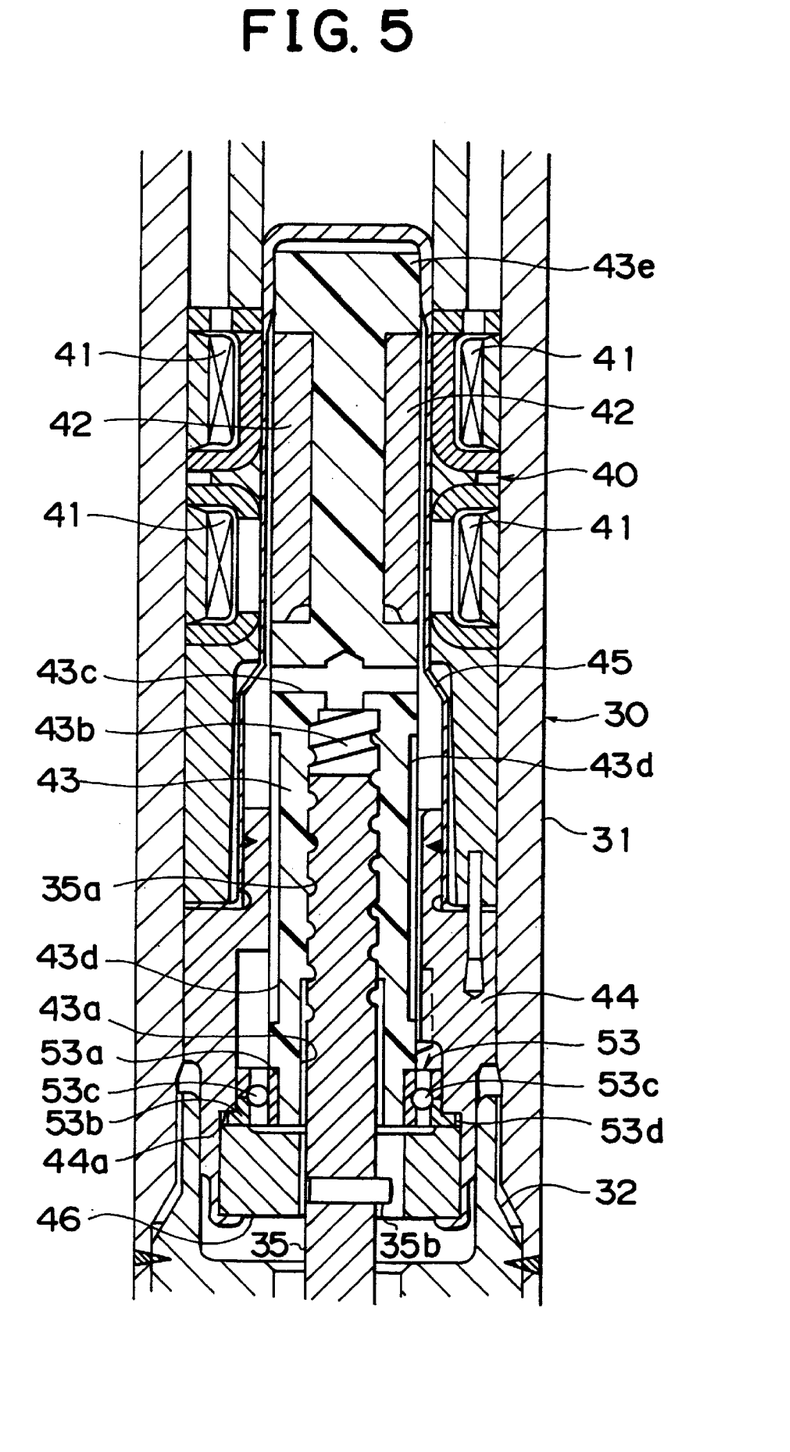
FIG. 5 is an enlarged longitudinal sectional view of a piston rod according to a third embodiment of the invention.

A third embodiment of the invention will be described with reference to FIG. 5. As shown in FIG. 5, the third embodiment replaces the ball bearing 52 of the second embodiment with a large-diameter portion 43e formed in a rotating body 43.

The large-diameter portion 43e is formed in an upper end portion of the rotating body 43. The diameter of the large-diameter portion 43e is substantially equal to the inside diameter of a sleeve 45. As the rotating body 43 rotates about the axis of the rotating body 43, the outer peripheral surface of the large-diameter portion 43e slides on the inner peripheral surface of the sleeve 45. That is, the sleeve 45 directly supports an upper end portion of the rotating body 43 in a rotatable manner. The rotating body 43 is formed from a resin, so that the large-diameter portion 43e of this embodiment can be more easily formed so as to conform to the inside diameter of the sleeve 45 than the ball bearing 47 of the foregoing embodiments. As a result, the third embodiment makes it possible to form the sleeve 45 into a simple configuration. Therefore, it becomes possible to support the rotating body 43 on the inner peripheral surface of the piston rod 30 in such a manner that the rotating body 43 is rotatable about the piston rod axis 30 while the construction of the variable-damping force shock absorber is simplified.

Figure 6:
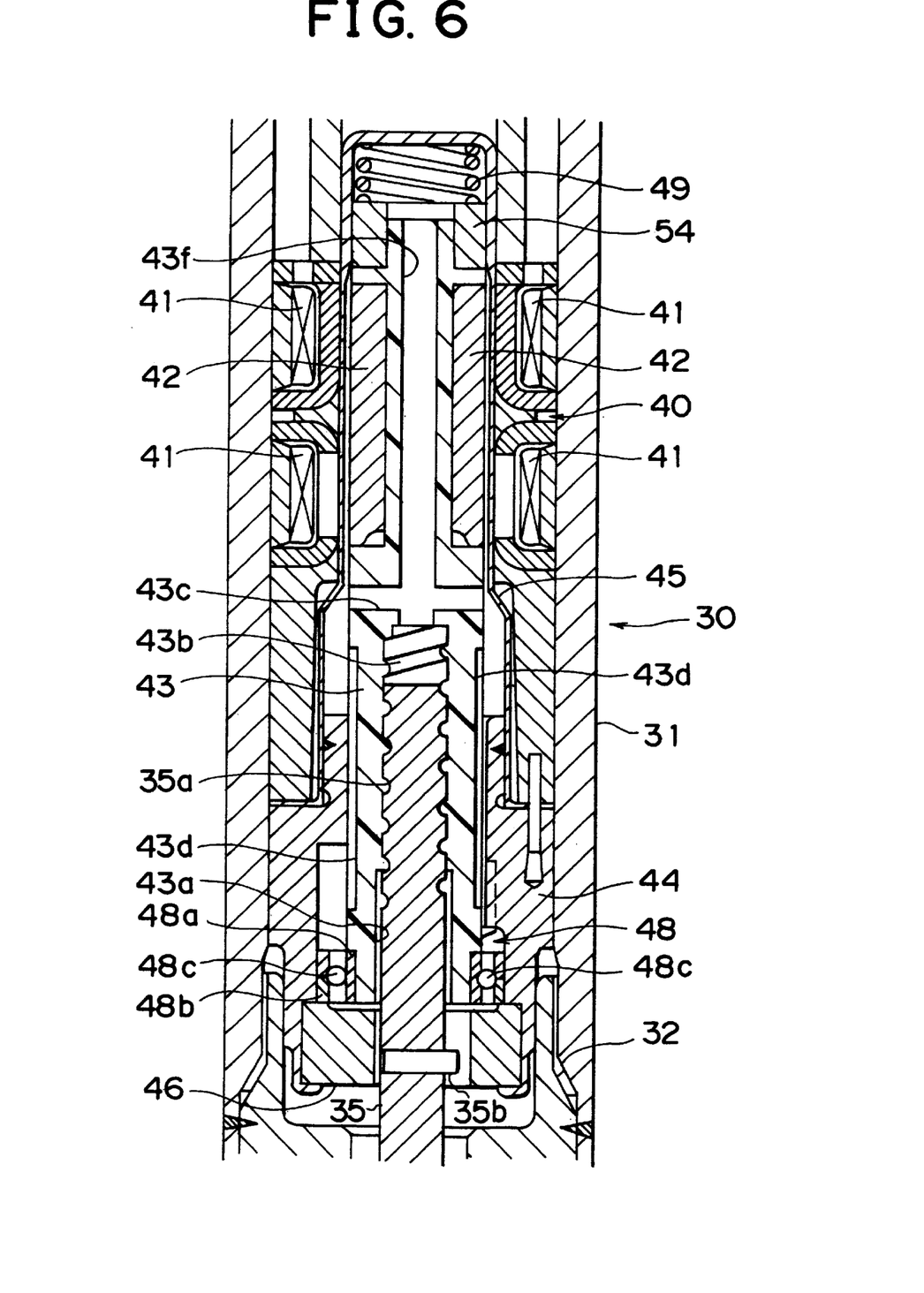
FIG. 6 is an enlarged longitudinal sectional view of a piston rod according to a fourth embodiment of the invention.

A fourth embodiment of the invention will be described with reference to FIG. 6. As shown in FIG. 6, the fourth embodiment adopts a construction in which a rotating body 43 similar to that of the first embodiment has a through passage 43f and in which the ball bearing 47 is replaced by a metal bush 54.

The through passage 43f extends in an upper portion of the rotating body 43 in directions of an axis of the rotating body 43. The through passage 43f has an opening at a central position in an upper end face of the rotating body 43. The through passage 43f connects the outside of an upper portion of the rotating body 43 and the inside of an insert hole 43a in communication to each other. It may be recommendable to form the through-passage 43f simultaneously with the rotating body 43 in the molding process of the rotating body 43 by setting an insert shaft in a mold for the rotating body 43. The metal bush 54 has an annular shape and is formed from, for example, a metal. As the rotating body 43 rotates about the axis thereof, the inner peripheral surface of the metal bush 54 slides on an upper end portion of the rotating body 43, and the outer peripheral surface of the metal bush 54 slides on the inner peripheral surface of a sleeve 45.

In the fourth embodiment, the operating fluid moves back and forth between the insert hole 43a of the rotating body 43 and the outside of an upper portion of the rotating body 43 via the through passage 43f as the shaft 35 reciprocates in the insert hole 43a. As a result, efficient circulation of the operating fluid around the entire rotating body 43 is achieved. Therefore, it becomes possible to smoothly rotate the rotating body 43 while the rotating body 43 is supported by the simply-constructed low-cost metal bush 54. The aforementioned efficient circulation of the operating fluid efficiently cools or removes heat that is generated as the permanent magnets 42 of the actuator 40 turn relative to the coils 41.

Although the fourth embodiment employs the ball bearing 48 and the metal bush 54 as bearings for supporting the rotating body 43, it is also possible to adopt, instead of this construction, a construction in which the metal bush 54 is replaced by a fixed bearing such as the ball bearing 52 employed in the second embodiment, a construction in which instead of the metal bush 54, the large-diameter portion 43e of the rotating body 43 is directly supported to the inner peripheral surface of the sleeve 45, or the like. Such constructions also achieve the advantages of the invention.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. A variable-damping force shock absorber comprising:
   a cylinder containing an operating fluid; a piston slidably mounted in the cylinder slidably for motion in a direction of an axis of the cylinder, the piston dividing the cylinder into a first chamber and a second chamber;
   a hollow piston rod, a first end portion of the piston rod being connected to the piston and a second end portion of the piston rod protruding from an end face of the cylinder;
   a communication passage connecting the first and second chambers of the cylinder;
   a valve mechanism provided at the first end portion of the piston rod, the valve mechanism having a spool movable in a direction of a piston rod axis, the valve mechanism changing an opening of the communication passage in accordance with a displacement of the spool in the direction of the piston rod axis;
   an actuator including a stator mounted to an inner peripheral face of the piston rod, a rotor facing the stator so as to rotate about the piston rod axis relative to the stator, and a rotating body supported for rotation about the piston rod axis at the inner peripheral surface of the piston rod, the rotating body and the rotor being fixed to each other so that the rotating body rotates together with the rotor, wherein the actuator outputs a rotating drive force created by rotation of the rotor, via the rotating body; and
   a drive force converting mechanism that converts the rotating drive force from the actuator into a drive force in the direction of the piston rod axis and transfers the drive force to the spool of the valve mechanism to displace the spool in the direction of the piston rod axis, wherein the rotor of the actuator and the drive force converting mechanism are separated in the direction of the piston rod axis, wherein the drive force converting mechanism includes a shaft disposed in the piston rod so that the shaft is allowed to move in the direction of the piston rod axis and is prevented from turning about the piston rod axis, a first end portion of the shaft being connected to the spool and a screw mechanism having a first screw portion being formed in a second end portion of the shaft, wherein a second screw portion is formed in the rotating body of the actuator, the first and second screw portions being engaged with one another, the screw mechanism displacing the shaft in the direction of the piston rod axis as the rotating body rotates, wherein the rotating body of the actuator is cylindrical and coaxial with the piston rod axis, wherein the rotor is embedded in a side face of the rotating body and an insert hole into which the first end portion of the shaft is inserted is formed in an end face of the rotating body, and wherein the screw mechanism includes a female thread formed in the insert hole of the rotating body and a male thread formed on an outer peripheral face of the first end portion of the shaft.

2. A variable-damping force shock absorber according to claim 1, further comprising a bypass passage formed in the rotating body of the actuator to connect an outside of the rotating body and a bottom portion of the insert hole, and wherein the second chamber of the cylinder is connected to the insert hole of the rotating body via an outer peripheral face of the shaft, an outer peripheral face of the rotating body and the bypass passage.

3. A variable-damping force shock absorber according to claim 2, wherein the rotating body has, in a side face of the rotating body, a groove extending in a direction of an axis of the rotating body.

4. A variable-damping force shock absorber according to claim 3, further comprising:
   a hollow-bottomed cylindrical support member fixed to the inner peripheral face of the piston rod coaxially with the piston rod, the support member accommodating therein the rotating body of the actuator; and
   an annular bearing fixed, an inner peripheral face thereof being fixed to the rotating body at a side of an open end of the support member, an outer peripheral face of the fixed bearing being fixed to an open end portion of the support member in the direction of the piston rod axis.

5. A variable-damping force shock absorber according to claims 4, wherein the rotating body of the actuator has a through passage that opens to an end face of the rotating body opposite from the end face of the rotating body to which the insert hole opens, the through passage connecting an outside of the rotating body and a bottom portion of the insert hole.

6. A variable-damping force shock absorber according to claim 3, further comprising a hollow cylindrical support member fixed to the inner peripheral face of the piston rod coaxially with the piston rod, the support member accommodating therein the rotating body of the actuator, wherein an inner peripheral face of the support member directly supports a portion of the rotating body of the actuator for rotation about the piston rod axis.

7. A variable-damping force shock absorber according to claim 6, wherein the rotating body of the actuator has a through passage that opens to an end face of the rotating body opposite from the end face of the rotating body to which the insert hole opens, the through passage connecting an outside of the rotating body and a bottom portion of the insert hole.

8. A variable-damping force shock absorber according to claim 3, wherein the rotating body of the actuator has a through passage that opens to an end face of the rotating body opposite from the end face of the rotating body to which the insert hole opens, the through passage connecting an outside of the rotating body and a bottom portion of the insert hole.

9. A variable-damping force shock absorber according to claim 2, further comprising:
   a hollow-bottomed cylindrical support member fixed to the inner peripheral face of the piston rod coaxially with the piston rod, the support member accommodating therein the rotating body of the actuator; and
   an annular bearing, an inner peripheral face thereof being fixed to the rotating body at a side of an open end of the support member, an outer peripheral face of the fixed bearing being fixed to an open end portion of the support member in the direction of the piston rod axis.

10. A variable-damping force shock absorber according to claim 9, wherein the rotating body of the actuator has a through passage that opens to an end face of the rotating body opposite from the end face of the rotating body to which the insert hole opens, the through passage connecting an outside of the rotating body and a bottom portion of the insert hole.

11. A variable-damping force shock absorber according to claim 2, further comprising a hollow-cylindrical support member fixed to the inner peripheral face of the piston rod coaxially with the piston rod, the support member accommodating therein the rotating body of the actuator, wherein an inner peripheral face of the support member directly supports a portion of the rotating body of the actuator for rotation about the piston rod axis.

12. A variable-damping force shock absorber according to claim 11, wherein the rotating body of the actuator has a through passage that opens to an end face of the rotating body opposite from the end face of the rotating body to which the insert hole opens, the through passage connecting an outside of the rotating body and a bottom portion of the insert hole.

13. A variable-damping force shock absorber according to claim 2, wherein the rotating body of the actuator has a through passage that opens to an end face of the rotating body opposite from the end face of the rotating body to which the insert hole opens, the through passage connecting an outside of the rotating body and a bottom portion of the insert hole.

14. A variable-damping force shock absorber according to claim 1, further comprising:
   a hollow-bottomed cylindrical support member fixed to the inner peripheral face of the piston rod coaxially with the piston rod, the support, member accommodating therein the rotating body of the actuator; and
   an annular bearing, an inner peripheral face of which is fixed to the rotating body at a side of an open end of the support member, an outer peripheral face of the fixed bearing being fixed to an open end portion of the support member in the direction of the piston rod axis.

15. A variable-damping force shock absorber according to claim 14, wherein the rotating body of the actuator has a through passage that opens to an end face of the rotating body opposite from the end face of the rotating body to which the insert hole opens, the through passage connecting an outside of the rotating body and a bottom portion of the insert hole.

16. A variable-damping force shock absorber according to claim 1, further comprising a hollow cylindrical support member fixed to the inner peripheral face of the piston rod coaxially with the piston rod, the support member accommodating therein the rotating body of the actuator, wherein an inner peripheral face of the support member directly supports a portion of the rotating body of the actuator for rotation about the piston rod axis.

17. A variable-damping force shock absorber according to claim 16, wherein the rotating body of the actuator has a through passage that opens to an end face of the rotating body opposite from the end face of the rotating body to which the insert hole opens, the through passage connecting an outside of the rotating body and a bottom portion of the insert hole.

18. A variable-damping force shock absorber according to claim 1, wherein the rotating body of the actuator has a through passage that opens to an end face of the rotating body opposite from the end face of the rotating body to which the insert hole opens, the through passage connecting an outside of the rotating body and a bottom portion of the insert hole.

19. A variable-damping force shock absorber comprising:
a cylinder containing an operating fluid; a piston slidably mounted in the cylinder slidably for motion in a direction of an axis of the cylinder, the piston dividing the cylinder into a first chamber and a second chamber;
a hollow piston rod, a first end portion of the piston rod being connected to the piston and a second end portion of the piston rod protruding from an end face of the cylinder;
a communication passage connecting the first and second chambers of the cylinder;
a valve mechanism provided at the first end portion of the piston rod, the valve mechanism having a spool movable in a direction of a piston rod axis, the valve mechanism changing an opening of the communication passage in accordance with a displacement of the spool in the direction of the piston rod axis;
an actuator including a stator mounted to an inner peripheral face of the piston rod, a rotor facing the stator so as to rotate about the piston rod axis relative to the stator, and a rotating body supported for rotation about the piston rod axis at the inner peripheral surface of the piston rod, the rotating body and the rotor being fixed to each other so that the rotating body rotates together with the rotor, wherein the actuator outputs a rotating drive force created by rotation of the rotor, via the rotating body; and
a drive force converting mechanism that converts the rotating drive force from the actuator into a drive force in the direction of the piston rod axis and transfers the drive force to the spool of the valve mechanism to displace the spool in the direction of the piston rod axis,
wherein the rotor of the actuator and the drive force converting mechanism are separated in the direction of the piston rod axis,
wherein the drive force converting mechanism includes a shaft disposed in the piston rod so that the shaft is allowed to move in the direction of the piston rod axis and is prevented from turning about the piston rod axis, a first end portion of the shaft being connected to the spool and a screw mechanism having a first screw portion being formed in a second end portion of the shaft, wherein a second screw portion is formed in the rotating body of the actuator, the first and second screw portions being engaged with one another, the screw mechanism displacing the shaft in the direction of the piston rod axis as the rotating body rotates,
said variable-damping force shock absorber further comprising:
a hollow-bottomed cylindrical support member fixed to the inner peripheral face of the piston rod coaxially with the piston rod, the support member accommodating therein the rotating body of the actuator; and
an annular bearing, an inner peripheral face of which is fixed to the rotating body at a side of an open end of the support member, an outer peripheral face of the fixed bearing being fixed to an open end portion of the support member in the direction of the piston rod axis,
wherein the rotating body of the actuator has a through passage that opens to an end face of the rotating body opposite from the end face of the rotating body to which the insert hole opens, the through passage connecting an outside of the rotating body and a bottom portion of the insert hole.

20. A variable-damping force shock absorber comprising:
a cylinder containing an operating fluid; a piston slidably mounted in the cylinder slidably for motion in a direction of an axis of the cylinder, the piston dividing the cylinder into a first chamber and a second chamber;
a hollow piston rod, a first end portion of the piston rod being connected to the piston and a second end portion of the piston rod protruding from an end face of the cylinder;
a communication passage connecting the first and second chambers of the cylinder;
a valve mechanism provided at the first end portion of the piston rod, the valve mechanism having a spool movable in a direction of a piston rod axis, the valve mechanism changing an opening of the communication passage in accordance with a displacement of the spool in the direction of the piston rod axis;
an actuator including a stator mounted to an inner peripheral face of the piston rod, a rotor facing the stator so as to rotate about the piston rod axis relative to the stator, and a rotating body supported for rotation about the piston rod axis at the inner peripheral surface of the piston rod, the rotating body and the rotor being fixed to each other so that the rotating body rotates together with the rotor, wherein the actuator outputs a rotating drive force created by rotation of the rotor, via the rotating body; and
a drive force converting mechanism that converts the rotating drive force from the actuator into a drive force in the direction of the piston rod axis and transfers the drive force to the spool of the valve mechanism to displace the spool in the direction of the piston rod axis,
wherein the rotor of the actuator and the drive force converting mechanism are separated in the direction of the piston rod axis,
wherein the drive force converting mechanism includes a shaft disposed in the piston rod so that the shaft is allowed to move in the direction of the piston rod axis and is prevented from turning about the piston rod axis, a first end portion of the shaft being connected to the spool and a screw mechanism having a first screw portion being formed in a second end portion of the shaft, wherein a second screw portion is formed in the rotating body of the actuator, the first and second screw portions being engaged with one another, the screw mechanism displacing the shaft in the direction of the piston rod axis as the rotating body rotates, said variable-damping force shock absorber further comprising a hollow cylindrical support member fixed to the inner peripheral face of the piston rod coaxially with the piston rod, the support member accommodating therein the rotating body of the actuator, wherein an inner peripheral face of the support member directly supports a portion of the rotating body of the actuator for rotation about the piston rod axis, and wherein the rotating body of the actuator has a through passage that opens to an end face of the rotating body opposite from the end face of the rotating body to which the insert hole opens, the through passage connecting an outside of the rotating body and a bottom portion of the insert hole.

21. A variable-damping force shock absorber comprising:

a cylinder containing an operating fluid; a piston slidably mounted in the cylinder slidably for motion in a direction of an axis of the cylinder, the piston dividing the cylinder into a first chamber and a second chamber;

a hollow piston rod, a first end portion of the piston rod being connected to the piston and a second end portion of the piston rod protruding from an end face of the cylinder;

a communication passage connecting the first and second chambers of the cylinder;

a valve mechanism provided at the first end portion of the piston rod, the valve mechanism having a spool movable in a direction of a piston rod axis, the valve mechanism changing an opening of the communication passage in accordance with a displacement of the spool in the direction of the piston rod axis;

an actuator including a stator mounted to an inner peripheral face of the piston rod, a rotor facing the stator so as to rotate about the piston rod axis relative to the stator, and a rotating body supported for rotation about the piston rod axis at the inner peripheral surface of the piston rod, the rotating body and the rotor being fixed to each other so that the rotating body rotates together with the rotor, wherein the actuator outputs a rotating drive force created by rotation of the rotor, via the rotating body; and a drive force converting mechanism that converts the rotating drive force from the actuator into a drive force in the direction of the piston rod axis and transfers the drive force to the spool of the valve mechanism to displace the spool in the direction of the piston rod axis, wherein the rotor of the actuator and the drive force converting mechanism are separated in the direction of the piston rod axis said variable-damping force shock absorber further comprising:

a hollow-bottomed cylindrical support member fixed to the inner peripheral face of the piston rod coaxially with the piston rod, the support member accommodating therein the rotating body of the actuator; and an annular bearing, on an inner peripheral face of which is fixed to the rotating body at a side of an open end of the support member, an outer peripheral face of the fixed bearing being fixed to an open end portion of the support member in the direction of the piston rod axis, wherein the rotating body of the actuator has a through passage that opens to an end face of the rotating body opposite from the end face of the rotating body to which the insert hole opens, the through passage connecting an outside of the rotating body and a bottom portion of the insert hole.

22. A variable-damping force shock absorber comprising:

a cylinder containing an operating fluid; a piston slidably mounted in the cylinder slidably for motion in a direction of an axis of the cylinder, the piston dividing the cylinder into a first chamber and a second chamber;

a hollow piston rod, a first end portion of the piston rod being connected to the piston and a second end portion of the piston rod protruding from an end face of the cylinder;

a communication passage connecting the first and second chambers of the cylinder;

a valve mechanism provided at the first end portion of the piston rod, the valve mechanism having a spool movable in a direction of a piston rod axis, the valve mechanism changing an opening of the communication passage in accordance with a displacement of the spool in the direction of the piston rod axis;

an actuator including a stator mounted to an inner peripheral face of the piston rod, a rotor facing the stator so as to rotate about the piston rod axis relative to the stator, and a rotating body supported for rotation about the piston rod axis at the inner peripheral surface of the piston rod, the rotating body and the rotor being fixed to each other so that the rotating body rotates together with the rotor, wherein the actuator outputs a rotating drive force created by rotation of the rotor, via the rotating body; and a drive force converting mechanism that converts the rotating drive force from the actuator into a drive force in the direction of the piston rod axis and transfers the drive force to the spool of the valve mechanism to displace the spool in the direction of the piston rod axis, wherein the rotor of the actuator and the drive force converting mechanism are separated in the direction of the piston rod axis said variable-damping force shock absorber further comprising a hollow cylindrical support member fixed to the inner peripheral face of the piston rod coaxially with the piston rod, the support member accommodating therein the rotating body of the actuator, wherein an inner peripheral face of the support member directly supports a portion of the rotating body of the actuator for rotation about the piston rod axis, and wherein the rotating body of the actuator has a through passage that opens to an end face of the rotating body opposite from the end face of the rotating body to which the insert hole opens, the through passage connecting an outside of the rotating body and a bottom portion of the insert hole.

* * * * *